US012703981B2

(12) United States Patent
Frimpong

(10) Patent No.: US 12,703,981 B2

(45) Date of Patent: Aug. 11, 2026

(54) FREESTANDING KOJO HELIPAD FOR VTOL FLYING CARS

(71) Applicant: Frank Asamoah Frimpong, Los Angeles, CA (US)

(72) Inventor: Frank Asamoah Frimpong, Los Angeles, CA (US)

( * ) Notice: Subject to any disclaimer, the term of this patent is extended or adjusted under 35 U.S.C. 154(b) by 537 days.

(21) Appl. No.: 17/704,478

(22) Filed: Mar. 25, 2022

(65) Prior Publication Data

US 2022/0396921 A1 Dec. 15, 2022

Related U.S. Application Data

(63) Continuation-in-part of application No. 17/343,729, filed on Jun. 9, 2021, now abandoned.

(51) Int. Cl.

*E04F 11/18* (2006.01)

*B66B 9/00* (2006.01)

(Continued)

(52) U.S. Cl.

CPC ................ *E04F 11/18* (2013.01); *B66B 9/00* (2013.01); *E01F 3/00* (2013.01); *E04H 12/08* (2013.01);

(Continued)

(58) Field of Classification Search

CPC .. E01F 3/00; E01F 7/025; E04F 11/18; E04H 12/08; E04H 6/44; B64F 1/36; E04B 1/3404; E04B 1/34331; E04B 1/3483; B66B 1/14; B66B 1/468; B66B 9/00; B66B 2201/463

(Continued)

(56) References Cited

U.S. PATENT DOCUMENTS 405,306 A * 6/1889 Flad .......................... B61B 1/02 104/127

1,433,419 A * 10/1922 Schleier .................... B64F 1/36 244/114 R (Continued)

FOREIGN PATENT DOCUMENTS

CN 102444206 A * 5/2012

CN 203269096 U * 11/2013

(Continued)

*Primary Examiner* — Brian D Mattei

*Assistant Examiner* — Joseph J. Sadlon

(74) *Attorney, Agent, or Firm* — Emanus, LLC; Willie Jacques

(57) ABSTRACT

A structure having a quadrilateral base; at least three or more support pillars that is configured to form the quadrilateral base; a landing pad; an elevator shaft; a waiting platform operably arranged at a top of the elevator shaft; a staircase, the staircase is operably arranged between the waiting platform and the landing pad that is operable for allowing a passenger to climb from the waiting platform to the landing pad; a plurality of support beams operably arranged to support the waiting platform, staircase, and/or landing pad; a base guardrail operably arranged to protect the quadrilateral base; and an inlet passage arranged at a base of the elevator shaft, wherein the structure is a freestanding landing helipad platform that is configured to be operable for vertical takeoff and landing of at least one of a flying car and flying car taxi services.

19 Claims, 7 Drawing Sheets

(51) Int. Cl.

| | |
|---|---|
| ***E01F 3/00*** | (2006.01) |
| ***E04H 12/08*** | (2006.01) |
| *B66B 1/14* | (2006.01) |
| *B66B 1/46* | (2006.01) |

(52) U.S. Cl.
CPC ................. *B66B 1/14* (2013.01); *B66B 1/468* (2013.01); *B66B 2201/463* (2013.01)

(58) Field of Classification Search
USPC .......................... 51/49; 52/49, 27; 244/114 R
See application file for complete search history.

(56) References Cited

U.S. PATENT DOCUMENTS

| | | | | | | |
|---|---|---|---|---|---|---|
| 1,709,069 | A | * | 4/1929 | Fox | B64F 1/36 | 244/114 R |
| 1,746,101 | A | * | 2/1930 | Carver | B64F 1/14 | 244/114 R |
| 1,787,631 | A | * | 1/1931 | Kitzmiller | A63K 1/02 | 472/87 |
| 1,814,985 | A | * | 7/1931 | Florido | B64F 1/36 | 244/114 R |
| 1,925,442 | A | * | 9/1933 | Fournier | E04H 6/26 | 414/244 |
| 2,443,563 | A | * | 6/1948 | Jackson | B66B 9/00 | 446/424 |
| 2,481,343 | A | * | 9/1949 | Redstone | E01F 7/025 | 244/114 R |
| 2,828,166 | A | * | 3/1958 | Herring | B64F 5/50 | 182/115 |
| 3,033,499 | A | * | 5/1962 | Ash | E04H 3/00 | 52/27 |
| 3,157,374 | A | * | 11/1964 | Conrey | B64F 1/00 | 244/114 R |
| 3,191,316 | A | * | 6/1965 | Dryden | B64G 1/625 | 434/34 |
| 3,226,889 | A | * | 1/1966 | Debes | E04H 1/04 | D25/5 |
| 3,226,894 | A | * | 1/1966 | Burchardt | E04B 1/22 | 261/DIG. 11 |
| 3,437,218 | A | * | 4/1969 | Heinrich | E04H 6/282 | 414/253 |
| 3,440,781 | A | * | 4/1969 | Lott | E04B 1/3404 | D25/6 |
| 3,556,441 | A | * | 1/1971 | Oberlander | B64F 1/00 | 244/114 R |
| 3,636,667 | A | * | 1/1972 | Walz | E04B 1/34853 | 52/79.13 |
| 3,675,378 | A | * | 7/1972 | Neumann | E04H 6/28 | 414/231 |
| 3,708,934 | A | * | 1/1973 | Jones | E04H 6/44 | 52/236.1 |
| 3,755,973 | A | * | 9/1973 | Rader | E04B 1/3404 | 52/73 |
| 3,768,016 | A | * | 10/1973 | Townsend | H04B 7/155 | 455/25 |
| 3,881,699 | A | * | 5/1975 | Nusbaum | E04G 21/3247 | 256/65.05 |
| 3,915,319 | A | * | 10/1975 | Fairburn | E04H 6/44 | 244/114 R |
| 3,916,588 | A | * | 11/1975 | Magill | B64F 1/30 | 52/33 |
| 4,039,089 | A | * | 8/1977 | Kochanneck | E04H 6/287 | 414/256 |
| 4,136,492 | A | * | 1/1979 | Willingham | E04B 1/34823 | 52/79.14 |
| 4,434,595 | A | * | 3/1984 | de Brabant | E04H 1/04 | D25/5 |
| 4,726,316 | A | * | 2/1988 | Bruns | B63B 35/44 | 114/263 |
| 4,818,137 | A | * | 4/1989 | Gorlov | E01F 13/12 | 404/6 |
| 4,858,775 | A | * | 8/1989 | Crouch | B66B 9/00 | 212/312 |
| 4,860,996 | A | * | 8/1989 | Robbins, III | A01K 3/005 | 256/48 |
| 4,883,388 | A | * | 11/1989 | Cherbonnier | B63G 11/00 | 405/195.1 |
| 4,974,795 | A | * | 12/1990 | Christol | E01F 3/00 | 244/114 R |
| 5,173,027 | A | * | 12/1992 | Trevisani | E04H 6/183 | 414/241 |
| 5,176,440 | A | * | 1/1993 | Hecking | A63C 19/00 | 239/289 |
| 5,377,465 | A | * | 1/1995 | Kobori | E04B 1/3404 | 52/30 |
| 5,436,811 | A | * | 7/1995 | Hecking | A01G 25/00 | 239/289 |
| 5,456,562 | A | * | 10/1995 | Schlecker | E04H 6/287 | 414/256 |
| 5,478,182 | A | * | 12/1995 | Hildebrand | E04H 6/282 | 414/257 |
| 5,603,189 | A | * | 2/1997 | Levy | E04H 1/04 | 119/245 |
| 5,866,861 | A | * | 2/1999 | Rajamani | B66B 7/044 | 187/292 |
| 5,915,908 | A | * | 6/1999 | Beutler | E04H 6/285 | 414/263 |
| 6,866,252 | B2 | * | 3/2005 | Pulliam | A01K 3/001 | 256/42 |
| 7,059,451 | B2 | * | 6/2006 | Richey | B66B 9/00 | 187/242 |
| 7,465,141 | B1 | * | 12/2008 | Fournier | E04H 6/28 | 414/241 |
| 7,497,055 | B2 | * | 3/2009 | Stewart | E04H 1/04 | 52/169.4 |
| 7,958,616 | B2 | * | 6/2011 | Meyer, Jr. | A01K 3/001 | 119/514 |
| 7,993,107 | B2 | * | 8/2011 | Gevers | E04H 12/08 | 248/163.1 |
| 8,267,380 | B1 | * | 9/2012 | Dormeville | E01F 13/048 | 256/22 |
| 8,596,946 | B2 | * | 12/2013 | Lydle | B63C 1/00 | 414/277 |
| 8,640,340 | B2 | * | 2/2014 | Foo | B63B 35/003 | 29/897.3 |
| 8,763,762 | B2 | * | 7/2014 | Finschi | B66B 1/3407 | 187/391 |
| 9,121,308 | B2 | * | 9/2015 | Siegfriedsen | F03D 80/80 | |
| 9,428,366 | B2 | * | 8/2016 | Asai | B66B 17/12 | |
| 9,481,458 | B2 | * | 11/2016 | Casado | B60L 53/80 | |
| 9,701,425 | B2 | * | 7/2017 | Lee | G08G 5/26 | |
| 9,752,337 | B1 | * | 9/2017 | Stewart | E04F 11/02 | |
| 9,777,502 | B2 | * | 10/2017 | Curlander | B64F 1/025 | |
| 9,815,633 | B1 | * | 11/2017 | Kisser | B65G 37/02 | |
| 9,957,132 | B2 | * | 5/2018 | Berryhill | B66B 1/468 | |
| 10,124,912 | B2 | * | 11/2018 | Walsh | B64U 70/90 | |
| 10,131,409 | B2 | * | 11/2018 | Loudrup | B65D 90/008 | |
| 10,208,906 | B2 | * | 2/2019 | Cordova | A63B 43/06 | |
| 10,365,062 | B2 | * | 7/2019 | Oesch | F41A 23/02 | |
| 10,378,207 | B2 | * | 8/2019 | Gonda | E04H 12/02 | |
| 10,544,599 | B2 | * | 1/2020 | King | E04H 3/00 | |
| 10,556,774 | B2 | * | 2/2020 | Villa | B66B 1/28 | |
| 11,021,266 | B2 | * | 6/2021 | Fisher | G05D 1/0011 | |
| 11,036,240 | B1 | * | 6/2021 | Irschara | G01S 19/48 | |
| 11,050,905 | B2 | * | 6/2021 | Kirk, III | H04N 21/21805 | |
| 11,155,363 | B2 | * | 10/2021 | Baklycki | B64F 1/36 | |
| 11,225,762 | B2 | * | 1/2022 | Osborne | B64F 1/205 | |
| 11,332,340 | B2 | * | 5/2022 | Muncy | B66B 1/50 | |
| 11,416,008 | B2 | * | 8/2022 | Petersen | G08G 5/025 | |
| 11,619,062 | B2 | * | 4/2023 | Abrams | H01Q 1/246 | 52/111 |
| 11,633,058 | B2 | * | 4/2023 | Sun | A47G 29/141 | 232/43.1 |
| 11,634,927 | B2 | * | 4/2023 | Moore | E04H 17/16 | 256/19 |
| 11,732,499 | B2 | * | 8/2023 | Weston | B65H 57/16 | 29/446 |

(56) References Cited

U.S. PATENT DOCUMENTS

| | | | | | |
|---|---|---|---|---|---|
| 11,738,883 | B2 * | 8/2023 | O'Toole | A47G 29/141 340/946 |
| 11,805,757 | B1 * | 11/2023 | Klein | E04H 17/017 |
| 11,846,114 | B1 * | 12/2023 | Studebaker, Jr. | E04H 17/1486 |
| 11,912,408 | B2 * | 2/2024 | Falk-Petersen | B64U 80/10 |
| 11,912,438 | B2 * | 2/2024 | Wankewycz | B64F 1/007 |
| 12,012,229 | B2 * | 6/2024 | Villa | B60L 53/66 |
| 12,163,297 | B1 * | 12/2024 | Airoldi | E01F 3/00 |
| 2006/0144994 | A1 * | 7/2006 | Spirov | B64C 39/001 244/62 |
| 2009/0113821 | A1 * | 5/2009 | Guo | E04H 1/04 52/235 |
| 2010/0119338 | A1 * | 5/2010 | Webster | E04H 6/18 414/239 |
| 2011/0011015 | A1 * | 1/2011 | Halamka | E04H 6/08 52/302.1 |
| 2012/0257973 | A1 * | 10/2012 | Rebsdorf | F03D 13/25 416/146 R |
| 2014/0010619 | A1 * | 1/2014 | Dor-El | E04H 6/22 414/240 |
| 2014/0151502 | A1 * | 6/2014 | Kosheleff | B64F 1/007 244/114 R |
| 2014/0252168 | A1 * | 9/2014 | Brody | E04H 6/44 244/114 R |
| 2015/0329219 | A1 * | 11/2015 | Soederhuizen | B64F 1/00 244/114 R |
| 2016/0257423 | A1 * | 9/2016 | Martin | A47G 29/14 |
| 2017/0011333 | A1 * | 1/2017 | Greiner | G06K 7/10722 |
| 2017/0058549 | A1 * | 3/2017 | Stiesdal | E04H 12/08 |
| 2017/0175413 | A1 * | 6/2017 | Curlander | B64F 1/025 |
| 2017/0225802 | A1 * | 8/2017 | Lussier | B64U 10/20 |
| 2018/0111796 | A1 * | 4/2018 | Peigne | B66B 11/0233 |
| 2018/0135267 | A1 * | 5/2018 | Reales Bertomeo | E02B 17/0004 |
| 2019/0102730 | A1 * | 4/2019 | Giorgi | H04W 4/70 |
| 2019/0217971 | A1 * | 7/2019 | Comerford | B64D 1/02 |
| 2020/0023998 | A1 * | 1/2020 | Pawluski | B64F 1/222 |
| 2020/0122830 | A1 * | 4/2020 | Anderson | B60L 50/60 |
| 2021/0270243 | A1 * | 9/2021 | Baun | F03D 1/02 |
| 2021/0284492 | A1 * | 9/2021 | Sakai | B66B 3/006 |

FOREIGN PATENT DOCUMENTS

| | | | | | |
|---|---|---|---|---|---|
| DE | 102007008582 | A1 * | 10/2008 | B66B 9/00 |
| DE | 102019205490 | A1 * | 10/2020 | B66B 9/00 |
| EP | 590767 | A2 * | 4/1994 | E04F 11/002 |
| FR | 2757131 | A1 * | 6/1998 | B64F 5/10 |
| JP | H0258605 | A * | 2/1990 | |
| JP | 03103574 | A * | 4/1991 | |
| JP | 2001140223 | A * | 5/2001 | |
| JP | 2004002045 | A * | 1/2004 | |
| KR | 2014067849 | A * | 6/2014 | B63B 35/50 |
| KR | 20150030995 | A * | 3/2015 | E01F 3/00 |
| NO | 337879 | B1 * | 7/2016 | B63B 17/00 |
| WO | WO-8701754 | A1 * | 3/1987 | E04D 6/44 |
| WO | WO-2016046770 | A1 * | 3/2016 | E04B 1/34 |
| WO | WO-2018112635 | A1 * | 6/2018 | B64F 1/222 |
| WO | WO-2018122821 | A2 * | 7/2018 | B64C 39/026 |
| WO | WO-2018139723 | A1 * | 8/2018 | B64C 39/02 |
| WO | WO-2019020162 | A1 * | 1/2019 | B64F 1/00 |
| WO | WO-2020230148 | A1 * | 11/2020 | F03D 13/20 |

* cited by examiner

FREESTANDING KOJO HELIPAD FOR VTOL FLYING CARS

CROSS-REFERENCE TO RELATED APPLICATIONS

The present continuation-in-part patent application claims priority benefit under 35 U.S.C. 120 of the U.S. nonprovisional patent application Ser. No. 17/343,729 entitled "A Freestanding Kojo Helipad for VTOL Flying Cars", filed on 9 Jun. 2021. The contents of this/these related patent application(s) is/are incorporated herein by reference for all purposes to the extent that such subject matter is not inconsistent herewith or limiting hereof.

INCORPORATION BY REFERENCE OF SEQUENCE LISTING PROVIDED AS ATEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to helipads. More particularly, certain embodiments of the invention relate to a freestanding landing hub for flying cars and flying car taxi services, particularly for the use of vertical takeoff and landing vehicles (VTOL).

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that typical helipads are clearly marked hard surfaces often installed on the top of buildings, in yards, or in other areas free from obstacles, where helicopters and other vertical take-off and landing aircraft can land and take off safely. Such pads are usually made of concrete, and often have an H marked within a circle so they are visible from the air. Sometimes the weight limit in thousands of pounds and the maximum rotor diameter in feet are also marked on the pad. They are often seen at hospitals, off-shore platforms, the tops of skyscrapers, and the yards of wealthy individuals. Currently, free-standing structures that serve exclusively as a landing pad are not readily available on the market. Anyone wishing to board a flying car or taxi would have to use one of these currently available structures or try to find a safe place on their own. Attempting to land a VTOL flying car on the street would disturb the street flow of regular traffic. Current helipads are designed for helicopters and other aircraft, which generally weigh more and have larger rotors than a VTOL flying car is likely to have, and are generally private structures not designed for easy access by the public. Thus, a need exists for a reliable freestanding landing helipad for flying cars and flying car taxi services to avoid the above-mentioned problems.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
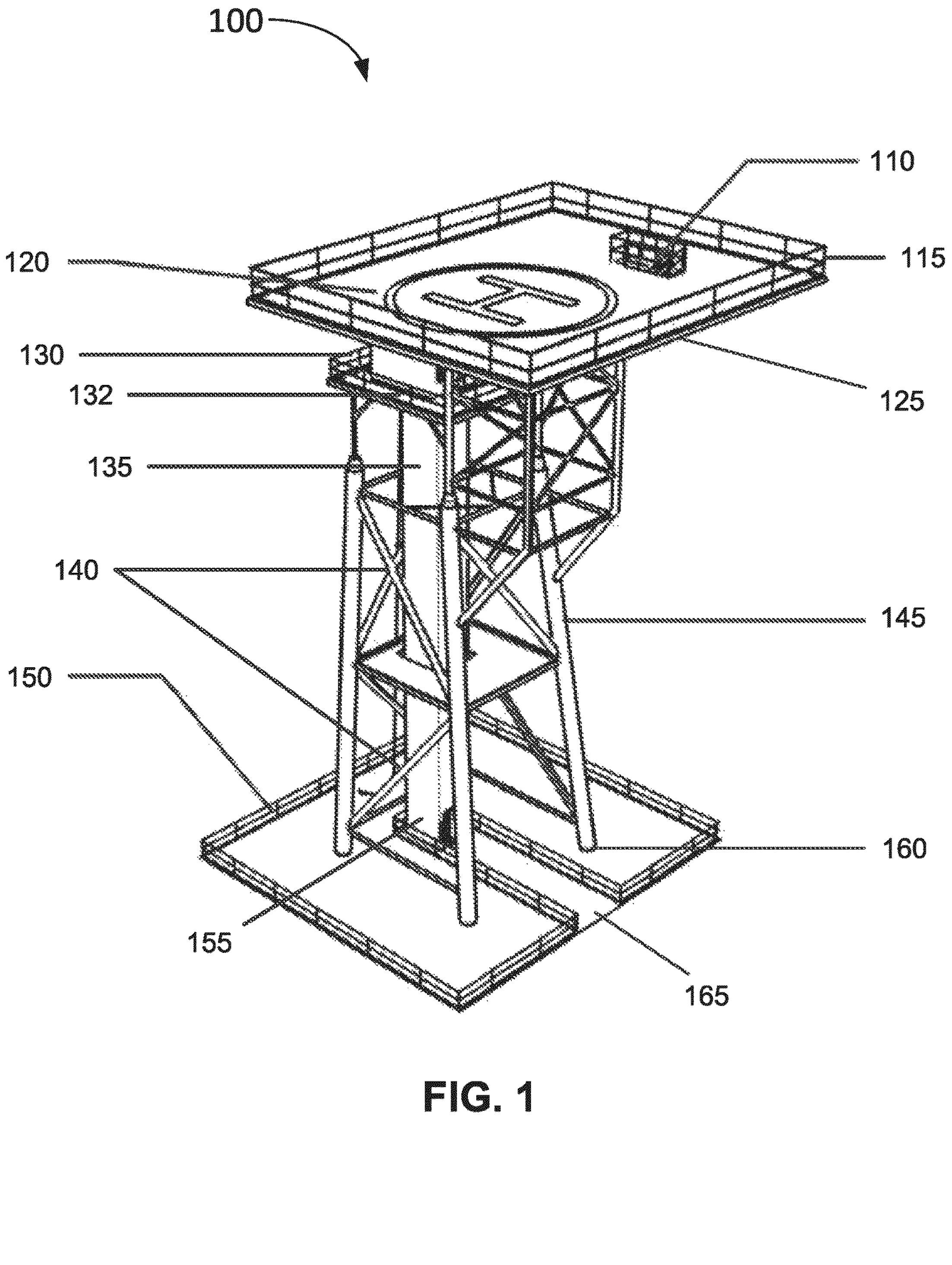
FIG. 1 shows a perspective sketch view illustrating an exemplary Kojo Helipad according to an embodiment of the present invention.

Unless otherwise indicated pictorial views and depictions in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially" ] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognized in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of Claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present application or of any further application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late-stage user(s) as opposed to early-stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising" And "contain" and variations of them—Such terms are open-ended and mean "including but not limited to". When employed in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . . ", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms. Thus, in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s).

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components is described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

In some embodiments of the present invention and variations thereof, relate to a freestanding landing hub for flying cars and flying car taxi services, particularly for the use of vertical takeoff and landing vehicles (VTOL) and/or Urban Air Mobility (UAM) flying vehicles. In view of the foregoing disadvantages inherent in the known helipad at the rooftop of buildings, the present invention provides a novel freestanding landing helipad. The general purpose of the present invention, which the drawing and 3-D pictures subsequently show in greater detail is to provide a freestanding landing helipad for, but not limited to, VTOL flying cars and flying car taxi services, eVTOL and/or UAM flying cars. The freestanding helipad landing for VOTL flying cars and eVTOL flying car taxi services, eVTOL and/or UAM flying cars may provide a freestanding structure capable of holding the weight of a VTOL/eVTOL/UAM car, a large space completely free of obstructions, and a safe waiting place for passengers, and, yet would operate reliably and be manufactured at a modest expense.

As of now, commuters are left with no other option but to wait in traffic and hope to make it to their destinations on time. The freestanding Kojo Helipad landing platform will allow clients to find flying car rides to their destinations, eliminating the need to wade through the stagnant ground traffic. The presently claimed invention will dramatically cut commuter time in traffic as well as open up a whole new short-range flying highway in the sky. The freestanding Kojo Helipad, in conjunction with flying car services, will give commuters the opportunity to save time and money all the while reducing city traffic immensely.

The unique features of this product provide the following benefits for people and commuters everywhere, on city streets as well as small towns that has no airports.

- The Kojo freestanding Helipad will offer the convenience to skip ground traffic caused by heavily populated cities.
- The design has been meticulously thought out to be freestanding which allows the Kojo Helipad to be installed practically anywhere near street intersections and street corners. For example, in backyards and front yards of individual houses.
- Cities will experience a heavy reduction in traffic because the Kojo Helipad will now open up the skies to short-range air travel pickups and drop offs at street corners and in small towns as well.
- Commuters and Consumers using the Kojo Helipad to board VTOL flying cars will save money by getting faster more efficient rides to their destinations.
- The freestanding Kojo Helipad that allows the operation of VTOL or UAM flying cars may very well eliminate road congestion which will allow cities to allocate money elsewhere.

The markets are extensive for an innovative product like the freestanding Kojo Helipad, as commuters worldwide will appreciate the added benefits and convenience of using this product. Brands specializing in ride sharing or flying cars for example Terrafugia, Uber and Lyft, will need the Kojo Helipad landing platform to solve the problem of creating easy places to pick up and drop off their passengers. The freestanding Kojo Helipad flying platform can be installed at individual homes, or on any public streets strategically placed within any city or small town.

Passengers will gather in line at the helipad site (similar to a bus stop) and board the elevator within the helipad to the top of the helipad's flight deck. They take the built-in elevator to the waiting level of the Kojo Helipad platform where they wait until instructed to board their flying-taxi. After safety checks are completed, the VTOL flying car takes off. The destination would have already been routed by the on-board control system of the flying taxi, and the passenger(s) will fly to their previously routed destination(s). Passengers will have the option to be dropped off at the free standing a street corner, or at designated flying car ports at the major points of the city such as but not limited to: theme parks, airports, office buildings and even personal properties. The present invention holds significant improvement as a free-standing helipad platform. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as thought herein without necessarily achieving other advantages as may be thought or suggested herein. The features of the invention which are believed to be novel are particularly pointed out and distinctly claimed in the concluding portion of the specification. These and other features, aspects, and advantages of the present invention will become better understood with reference to the following drawings and detailed 3-d picture descriptions.

In some embodiments of the present invention relate to a freestanding Kojo Helipad and more particularly to a freestanding landing platform for flying cars and flying car taxi services that can be used to improve the access to vertical takeoff and landing of VTOL flying vehicles.

The uniqueness of the freestanding Kojo Helipad is that it enables passenger pickups at the point of departure from a street corner, hotel, airport or a home by a VTOL vehicle to takeoff and drop passengers off directly at the point of arrival whether at a street corner, near a hotel, airport, or a house. This means freestanding Kojo Helipads connect passengers directly from point A to point B without any interceding driving on the street or any transfer vehicle from the point of departure to the point of arrival. This makes the utility and purpose of Kojo Helipads directly connected to the operation of VTOL flying vehicles as the sole purpose underlying the uniqueness of the invention of freestanding Kojo Helipads.

The present invention will now be described in detail with reference to embodiments thereof as illustrated in the accompanying drawings.

FIG. 1 shows a perspective sketch view illustrating an exemplary Kojo Helipad 100 according to an embodiment of the present invention. In one embodiment of the present invention, Kojo Helipad 100 is free standing and may include a metal structure with four main support pillars 145 forming a quadrilateral base 160. Alternatively, the metal structure has three (3) main support pillars 145. The metal structure is made of steel or a similarly strong and durable metal material. Base guardrails 150 protect quadrilateral base 160, and form an inlet passage 165 leading to a base 155 of an elevator shaft 135. Landing pad 125 may include a top or landing pad guardrail 115 for protecting users of the landing pad and staircase 110. The area marked H 120 is the parking slot an eVTOL or UAM flying car sits. The markings (e.g. letter 'H' and a circle around the letter 'H') are for visual reference for the flying cars where the letter 'H' may represent helipad. Little basket shaped box/staircase 110 is an opening entrance where passengers pop up to platform 125. Landing Pad Structure 125 indicates the tall steel structure that supports an elevator within it. The Guard Rail flat structure 150 gives a firm base to make the freestanding structure hold together forming quadrilateral base 160 and inlet passage 165 to the elevator.

In an embodiment, a plurality of metal beams 140 extending from four main support pillars 145 support a waiting platform 130 at the top of the elevator shaft. The plurality of metal beams 140 may be different sizes and form a number of configurations, depending on the exact strength and support requirements of the model of Kojo Helipad. Waiting platform 130 is surrounded by guardrails 132 to prevent passengers from falling off the edge while at the waiting platform. A staircase extends from waiting platform 130 to landing pad 125.

Figure 2:
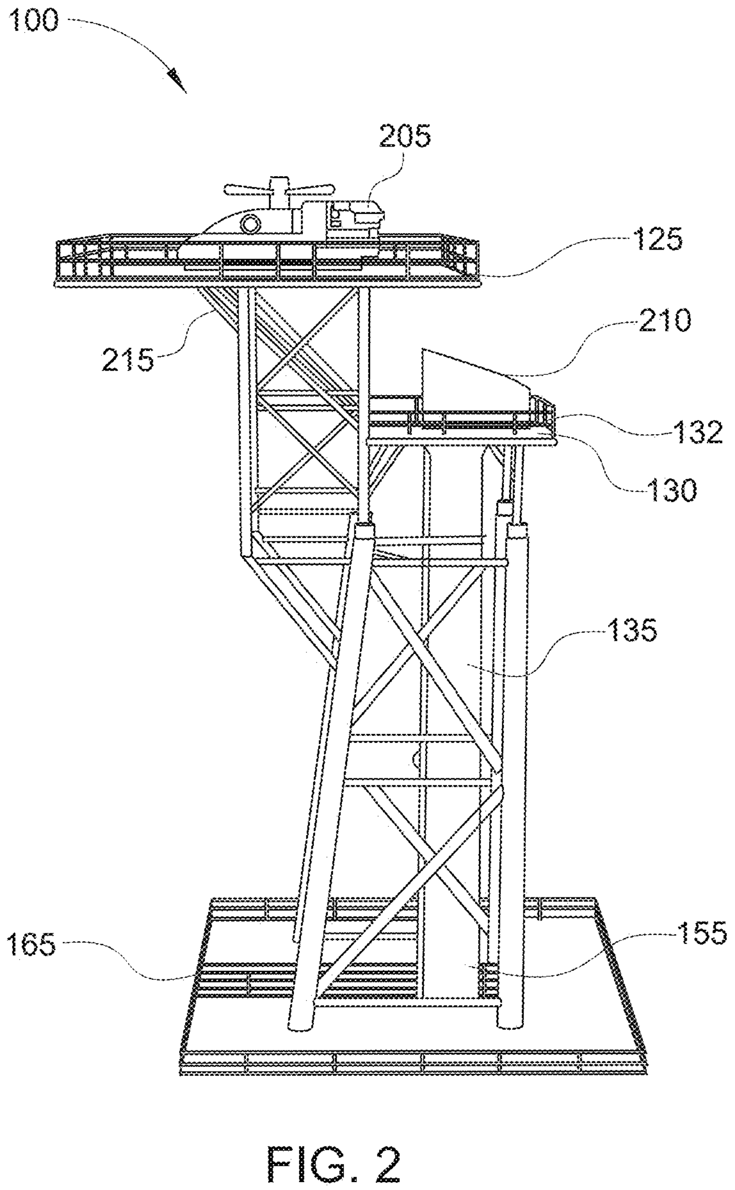
FIG. 2 is a perspective side pictorial view of an exemplary Kojo Helipad with a VTOL/eVTOL flying car atop according to an embodiment of the present invention.

FIG. 2 is a perspective side pictorial view of an exemplary Kojo Helipad 100 with an exemplary VTOL/eVTOL flying car 205 atop the landing pad according to an embodiment of the present invention. In one embodiment of the present invention, Kojo Helipad 100 may include an inlet passage 165 leading to base 155 of elevator shaft 135 with an elevator box 210 within structure 100. Waiting platform 130 is surrounded by guardrails 132 to prevent passengers from falling off the edge. Staircase 215 extends from waiting platform 130 to landing pad 125.

Figure 3:
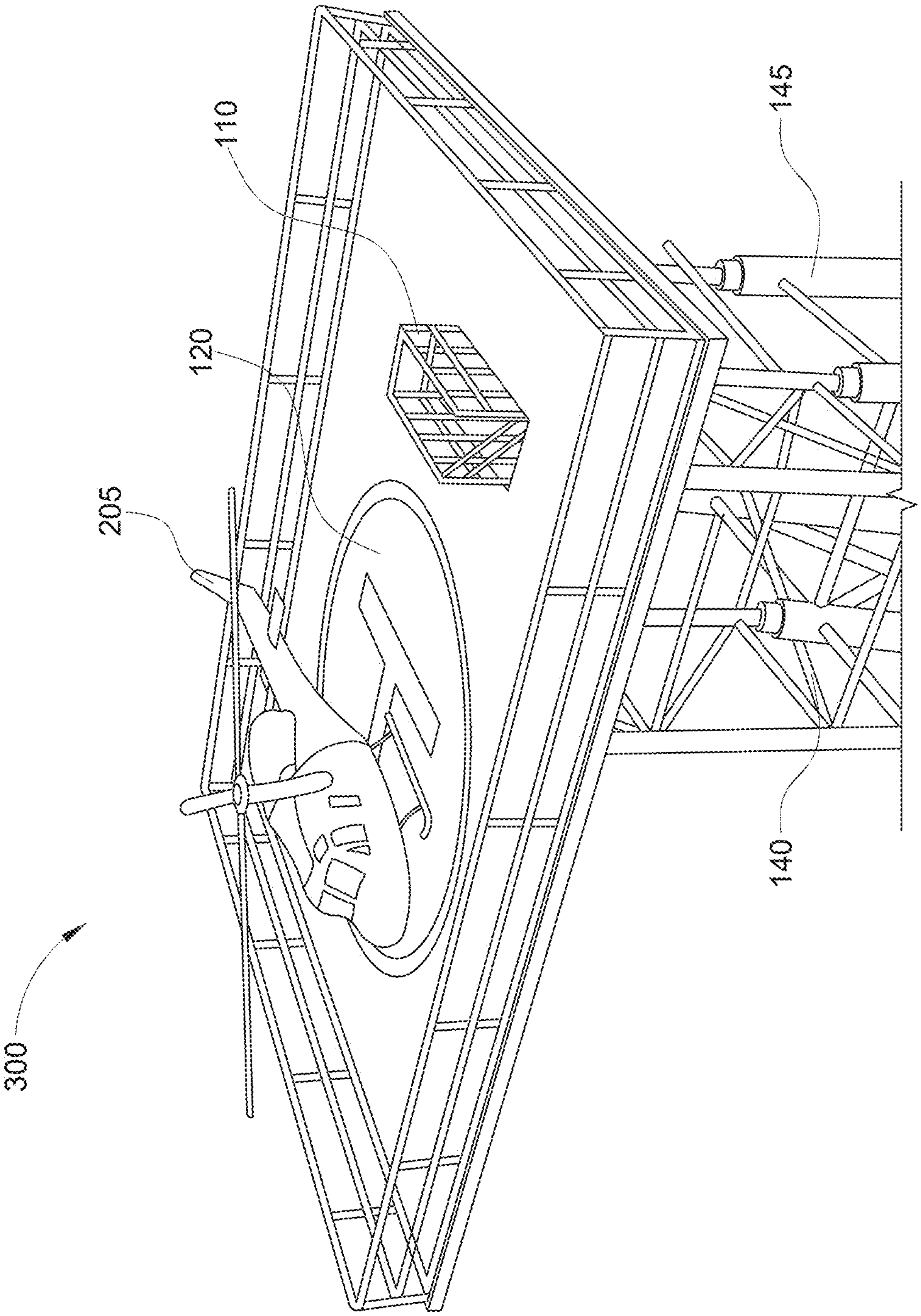
FIG. 3 is a perspective pictorial view illustrating an exemplary waiting platform (with a regular helicopter atop) according to an embodiment of the present invention.

FIG. 3 is a perspective pictorial view illustrating an exemplary waiting platform (with a regular helicopter atop) according to an embodiment of the present invention. Referring to FIGS. 1, 2, and 3, a plurality of metal beams 140 extending from the four main support pillars 145 support a waiting platform 130 at the top of the elevator shaft 135. The plurality of metal beams 140 may be different sizes and form a number of configurations, depending on the exact strength and support requirements of the model of Kojo Helipad 100. Waiting platform 130 is surrounded by guardrails 132 to prevent passengers from falling off the edge. Staircase 215 extends from waiting platform 130 to landing pad 125.

In some embodiment, landing pad 125 is a large, flat surface capable of supporting the weight of a flying vehicle and a group of passengers. Landing pad 125 is supported by the plurality of metal beams 140 extending from the four (4) main support pillars 145. Guardrails 115 surround the perimeter of landing pad 125 to prevent passengers from falling off the edge. Landing pad 125 may be made of steel, concrete, or any other material capable of meeting the strength and weight requirements of VTOL/eVTOL or UAM vehicles 205, which may vary over time depending on the flying vehicles 205 currently in use. Flying cars 205 may range in sizes, allowing groups of nearly any size to enjoy the convenience of the service, making it an ideal option for co-workers, family and friends, teams of ballplayers, musician groups etc.

Figure 4:
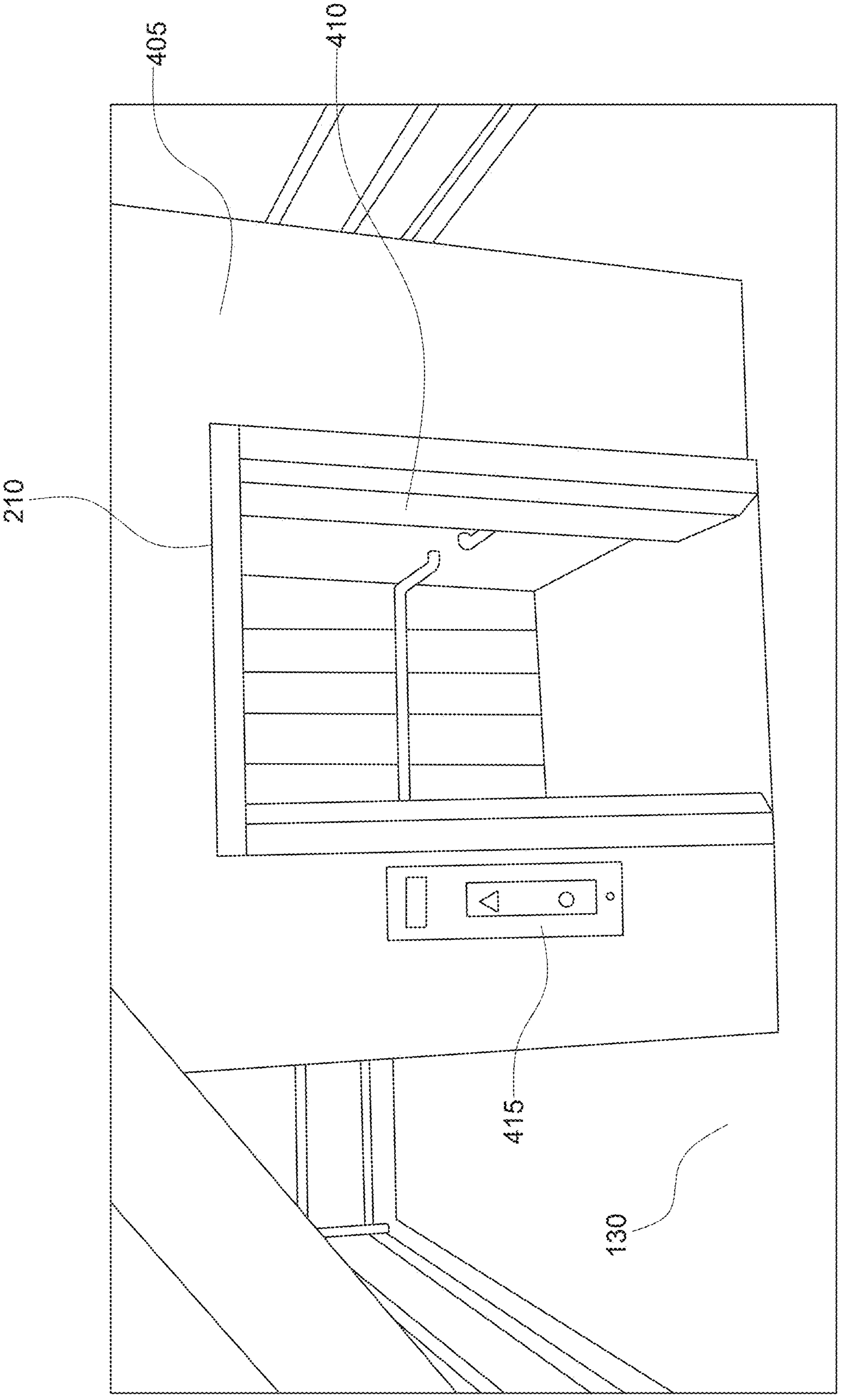
FIG. 4 is a perspective pictorial view illustrating an exemplary elevator door at the top level within the structure according to an embodiment of the present invention.

FIG. 4 is a perspective pictorial view illustrating an exemplary elevator box 210 at the top level within structure 100 according to an embodiment of the present invention. In one embodiment of the present invention, referring to FIGS. 1-4, elevator shaft 135 may include an outer shell 405 that houses the elevator box 210 and the elevator system. The elevator system includes a pulley, one or more programmable processors, motor(s), cables, and call buttons 415. The elevator box 210 has sliding doors 410 that open at the top and bottom of elevator shaft 135 to allow passengers to embark/disembark. An up and a down button inside elevator box 210 signals the one or more programmable processors to activate the elevator system to raise or lower elevator box 210 inside outer shell 405.

Figure 5:
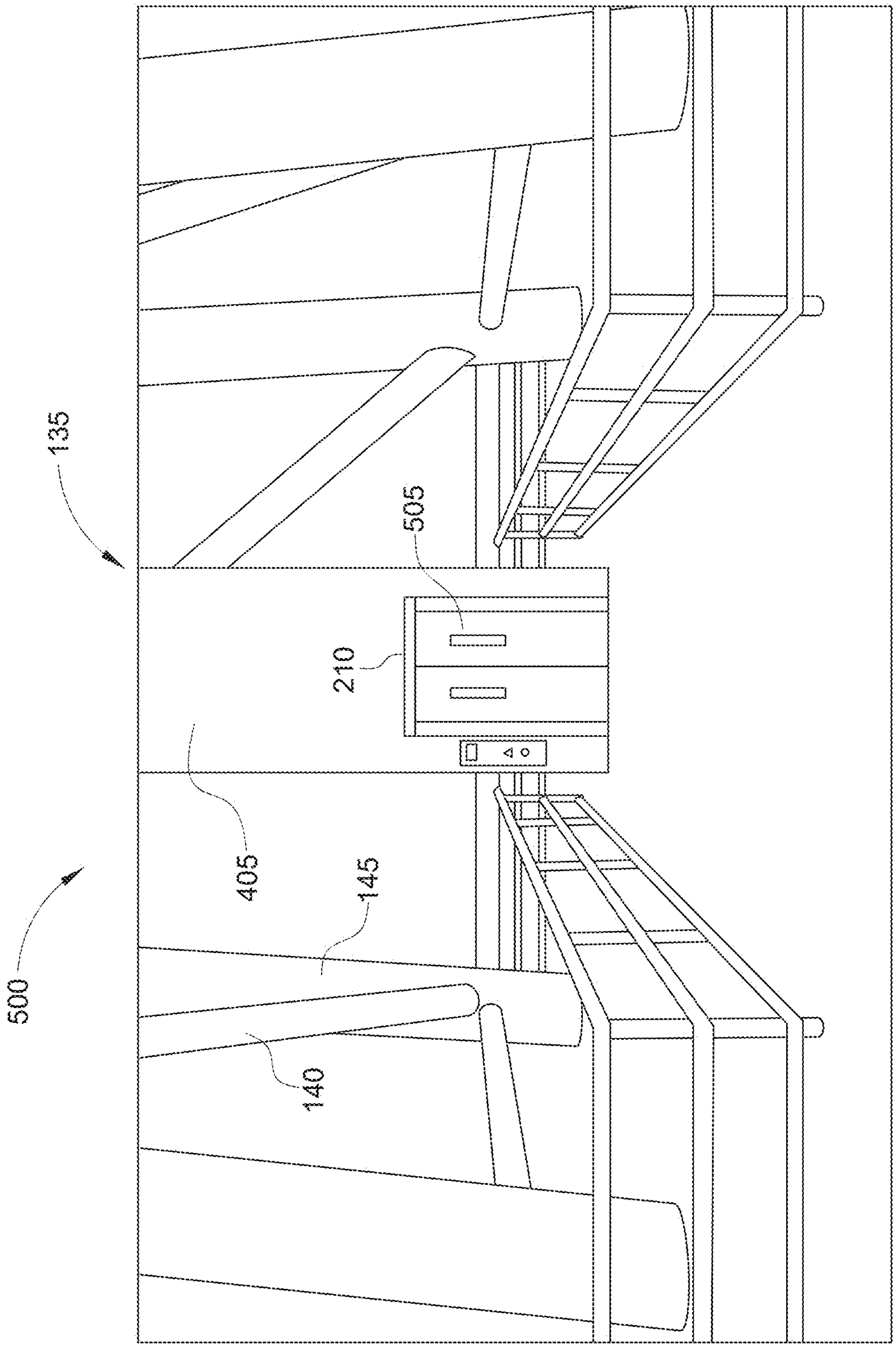
FIG. 5 shows a pictorial view of an exemplary elevator door at ground level according to an embodiment of the present invention.

FIG. 5 shows a pictorial view of elevator door 505 at ground level according to an embodiment of the present invention. In an embodiment of the present invention, elevator door 505 may open for patrons to get into the elevator that will carry them to the top of the landing pad where the VTOL taxi will be waiting. Plurality of metal beams 140 extending from four main support pillars 145 support waiting platform 130 at the top of elevator shaft 135.

Figure 6:
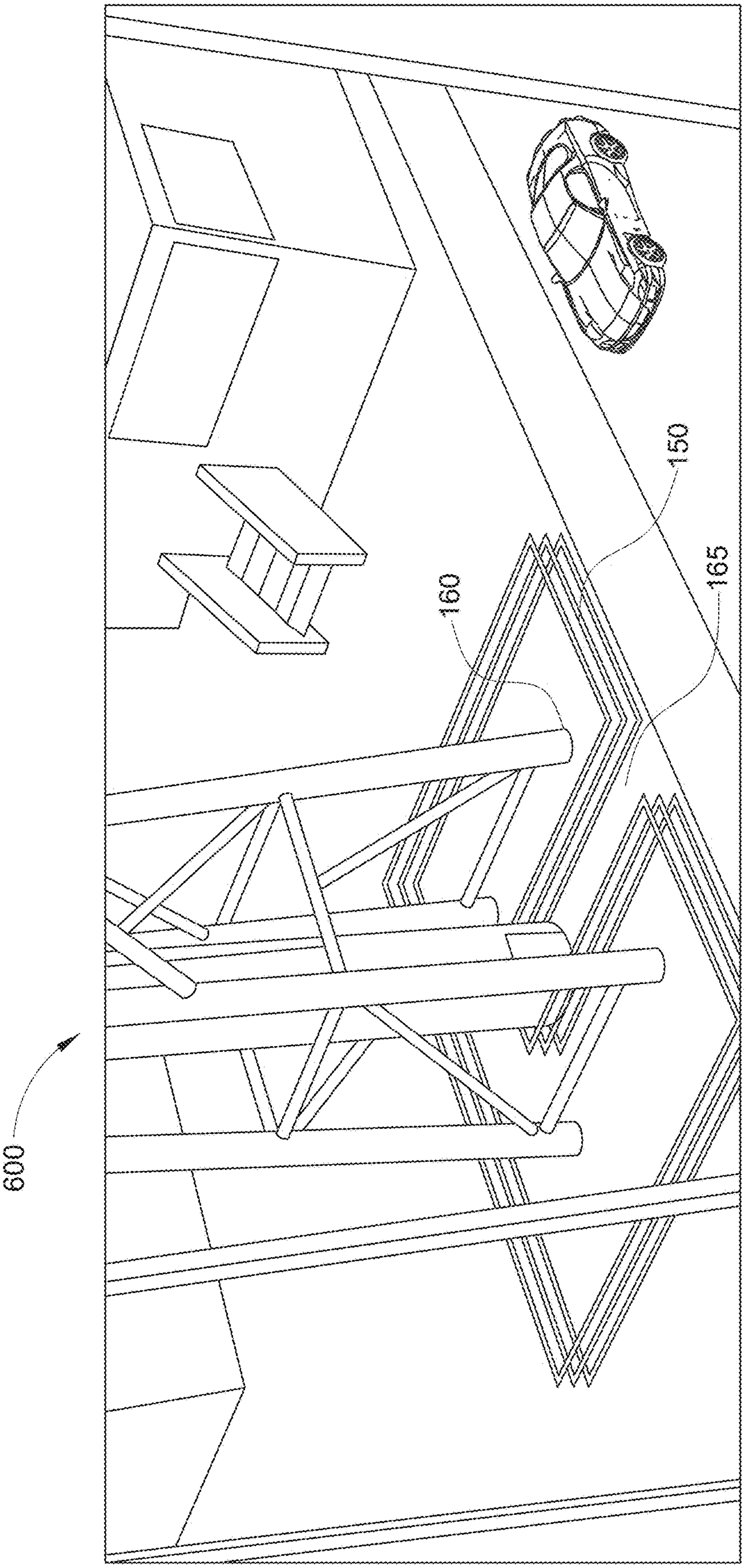
FIG. 6 shows a pictorial view of an exemplary foot or lower part of the Kojo Helipad in a backyard of a patron's house (along the street) according to an embodiment of the present invention.

FIG. 6 shows an exemplary foot or lower part 600 of the Kojo Helipad installed in a backyard of a patron's house (along the street) according to an embodiment of the present invention. In one embodiment of the present invention, referring to FIGS. 1 and 6, Kojo Helipad 100 may be used for VTOL pickup and drop off. Guard Rail 150 gives a firm base to make the freestanding structure hold together forming quadrilateral base 160 and inlet passage 165 to the elevator.

Figure 7:
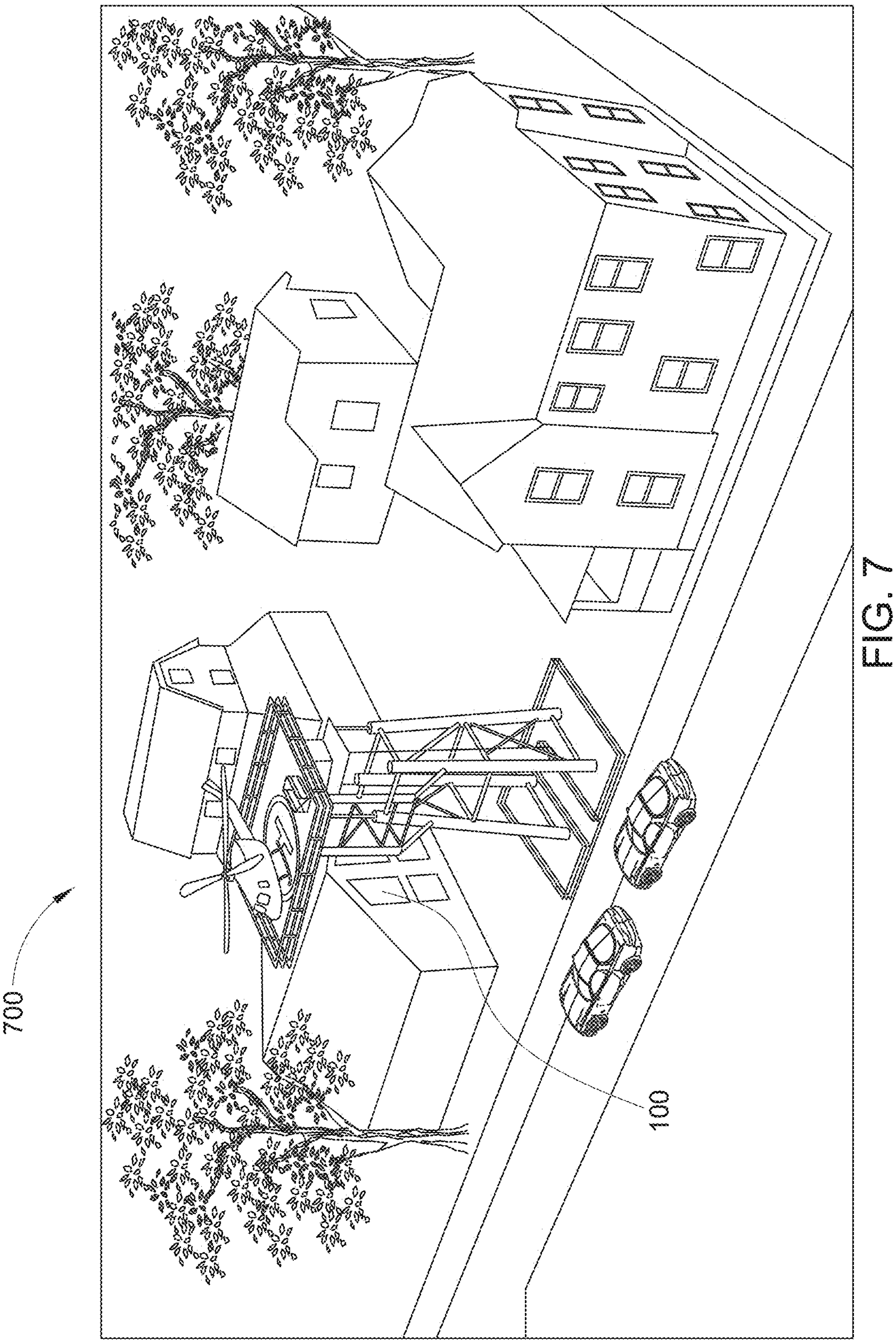
FIG. 7 depicts an exemplary free standing Kojo helipad structure wedged between buildings with an exemplary helicopter atop according to an embodiment of the present invention.

FIG. 7 depicts an exemplary free standing Kojo helipad according to an embodiment of the present invention. In one embodiment, Kojo helipad structure 100 may be safely wedged between buildings with a helicopter atop the Kojo helipad structure, along a city street that avoids interrupting the flow of street traffic.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claim's construction proceedings and/or examination of patent allowability properly identify and incorporate only the portions of each of these documents discovered during the broadest interpretation search of 35 USC § 112(6) (post AIA 112(f)) limitation, which exist in at least one of the patents and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3rd parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing freestanding landing hubs for flying cars and flying car taxi services according to the present invention will be apparent to those skilled in the art. Various aspects of the invention have been described above by way of illustration, and the specific embodiments disclosed are not intended to limit the invention to the particular forms disclosed. The particular implementation of the freestanding landing hub for flying cars and flying car taxi services may vary depending upon the particular context or application. By way of example, and not limitation, the freestanding landing hub for flying cars and flying car taxi services described in the foregoing were principally directed to landing hub for flying cars and flying car taxi services, particularly for the use of vertical takeoff and landing vehicles (VTOL) implementations; however, similar techniques may instead be applied to network towers or floating restaurants, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

Only those claims which employ the words "means for" or "steps for" are to be interpreted under 35 USC 112, sixth paragraph (pre-AIA) or 35 USC 112(f) post-AIA. Otherwise, no limitations from the specification are to be read into any claims, unless those limitations are expressly included in the claims.

What is claimed is:

1. A structure comprising:

a proximate quadrilateral base configured to support the structure as a freestanding helipad;

a base guardrail operably arranged to protect said proximate quadrilateral base, at least three or more support pillars that are configured to form said proximate quadrilateral base, wherein said at least three or more support pillars comprise steel;

a landing pad section, said landing pad section comprises an open landing pad disposed on a top portion of said structure;

a landing pad guardrail, wherein said landing pad guardrail comprises a proximate vertical guardrail that is configured to operably protect passengers, individuals or users from falling off said landing pad section;

an elevator shaft module, wherein a top portion of said elevator shaft module is operably arranged proximately below said landing pad section;

an outer elevator shell configured to operably house said elevator shaft module and an elevator system:

a waiting platform component below the landing pad section, wherein said waiting platform component is operably arranged as an open area walkway around a perimeter of said top portion of said elevator shaft module;

a waiting platform guardrail, said waiting platform guardrail is configured to operably create a barrier around a perimeter of said waiting platform component to prevent passengers, individuals or users from falling off said waiting platform component; and a staircase section, wherein said staircase section is configured to operably engage said waiting platform component and said landing pad section, and wherein said staircase section is configured to be operable for facilitating a transition of at least one passenger, individuals or users to at least one of, climb from said waiting platform component up to said landing pad section and descend from said landing pad section down to said waiting platform component.

2. The structure according to claim 1, in which said structure further comprising a landing helipad platform that is configured to be operable for vertical takeoff and landing of at least one of a flying vehicle and flying car taxi services.

3. The structure according to claim 2, wherein said landing pad guardrail is configured to be operable for protecting users of said landing pad.

4. The structure according to claim 3, wherein said waiting platform guardrail is configured to be operable for protecting users of said waiting platform component.

5. The structure according to claim 1, further comprising an elevator box module, said elevator box module is configured to at least one of, operably transport passengers, individuals or users to said waiting platform component and operably transport passengers, individuals or users to said quadrilateral base.

6. The structure according to claim 5, wherein said elevator system further comprises:

one or more pulleys;

one or more cables wherein the one or more cables are configured to operably raise and/or lower said elevator box module;

one or more motors that is/are configured to operably control said one or more cables; and one or more programmable processors that is/are configured to operably control said one or more motors.

7. The structure according to claim 6, in which said elevator system further includes a plurality of call buttons that are configured to operably activate said one or more programmable processors to signal where said elevator box module is needed.

8. The structure according to claim 1, wherein said landing pad comprises at least one of a concrete material and a steel material.

9. The structure according to claim 1, wherein said support pillars and support beams comprise steel material.

10. The structure according to claim 1, wherein a perimeter portion of said landing pad is edged by said landing pad guardrail, and said landing pad guardrail is further configured to be operable for preventing passengers from falling.

11. The structure according to claim 1, wherein a perimeter portion of said waiting platform component is edged with said waiting platform guardrail, and wherein said waiting platform guardrail is configured to be operable for preventing passengers from falling.

12. The structure according to claim 1, in which said landing pad comprises a parking slot part.

13. The structure according to claim 12, in which said parking slot part comprises an area marked with a proximate circle and letter 'H' for visual reference.

14. The structure according to claim 1, further comprising a plurality of metal beams for structural support.

15. A structure comprising:

a proximate quadrilateral base configured to support the structure as a freestanding helipad;

a base guardrail operably arranged to protect said proximate quadrilateral base, at least three or more support pillars that are configured to form said proximate quadrilateral base, wherein said at least three or more support pillars comprise steel;

a landing pad section;

a landing pad guardrail, wherein said landing pad guardrail comprises a proximate vertical guardrail that is configured to be operably protect passengers, individuals or users from falling off said landing pad section;

an elevator shaft module, wherein a top portion of said elevator shaft module is operably arranged proximately below said landing pad section;

an outer elevator shell configured to operably house said elevator shaft module and an elevator system:

a waiting platform component below the landing pad section, wherein said waiting platform component is operably arranged as an open area walkway around a perimeter portion of said top portion of said elevator shaft module;

a waiting platform component below the landing pad section, said waiting platform component is operably arranged as an open area walkway around perimeter portion of said top portion of said elevator shaft module;

a waiting platform guardrail, wherein said waiting platform guardrail is configured to operably create a barrier around a perimeter of said waiting platform component, wherein the waiting platform guardrail is further configured to be operable for preventing passengers, individuals or users from falling off said waiting platform component; and a staircase section, the staircase section is configured to engage the waiting platform component and said landing pad section, wherein said staircase section is configured to be operable for facilitating a transition of passengers, individuals or users to the waiting platform component and to the landing pad section;

said elevator system is configured to at least operably transport passengers, individuals or users;

an elevator box module, said elevator box module is configured to operably support the transport of passengers, individuals or users; and one or more programmable processors that is/are configured to operably control the transport of passengers, individuals or users.

16. The structure according to claim 15, in which said structure further comprises a landing helipad platform that is configured to be operable for vertical takeoff and landing of at least one of a flying vehicle and flying car taxi services.

17. The structure according to claim 16, in which the landing platform comprises a parking slot section with a letter 'H" and a proximate circle around the letter "H' for visual reference.

18. The structure according to claim 15, further comprising:

an up button that is configured to signal said one or more programmable processors to activate said elevator system to raise said elevator box module; and a down button that is configured to signal said one or more programmable processors to activate said elevator system to lower said elevator box module.

19. A structure comprising:

a proximate quadrilateral base configured to support the structure as a freestanding helipad;

a base guardrail operably arranged to protect said proximate quadrilateral base, at least three or more support pillars that are configured to form said proximate quadrilateral base, wherein said at least three or more support pillars comprise steel;

a landing pad section, wherein said landing pad section comprises a letter 'H" and a proximate circle around the letter 'H' for visual reference;

a landing pad guardrail disposed at a perimeter part of said landing pad section, wherein said landing pad guardrail is configured to be operable for protecting users of said landing pad section from falling;

an elevator shaft module, wherein a top portion of said elevator shaft module being operably arranged proximately below said landing pad section;

an outer elevator shell configured to operably house said elevator shaft module and an elevator system;

a waiting platform component below the landing pad section that is operably arranged as an open area walkway around a perimeter section of said top portion of said elevator shaft module, that is operably arranged proximately below said landing pad section;

a waiting platform guardrail, wherein said waiting platform guardrail is configured to be operable for preventing passengers, individuals or users from falling off said waiting platform component, and wherein said waiting platform guardrail is operably arranged to create a barrier around a perimeter part of said waiting platform component;

a staircase section, wherein said staircase section is operable for facilitating a transition of passengers, individuals or users to at least one of, climb from said waiting platform component up to the said landing pad section and descend from said landing pad section down to said waiting platform component;

said elevator system is configured to at least of, operably transport users from said quadrilateral base to the top portion of said elevator shaft module and operably transport users from the top portion of said elevator shaft module to said quadrilateral base;

an elevator box module, said elevator box module is configured to at least one of, support the transport of a passenger, individual or user from said quadrilateral base to the top portion of said elevator shaft module and support the transport of users from the top portion of said elevator shaft module to said quadrilateral base;

at least one or more sliding elevator door(s) that is/are configured to operably facilitate an embarking and/or disembarking from said elevator box module;

one or more programmable processors that is/are configured to at least one of, control the transport of passenger, individual or user from said quadrilateral base to the top portion of said elevator shaft module and control the transport of a passenger, individual or user from the top portion of said elevator shaft module to said quadrilateral base.

* * * * *